V. O. WOODRUFF.
RESILIENT TIRE.
APPLICATION FILED NOV. 6, 1920.
1,419,001.
Patented June 6, 1922.
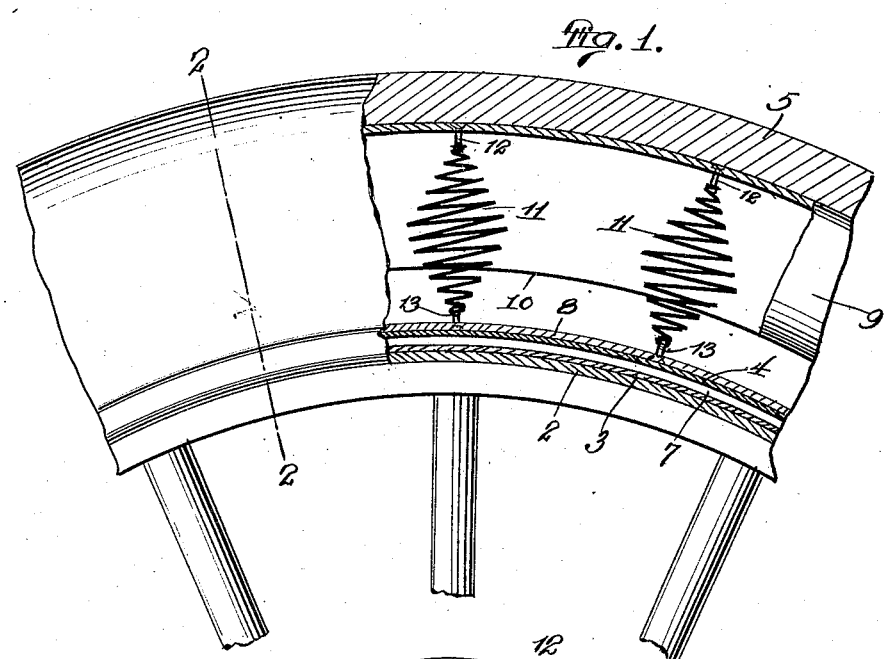
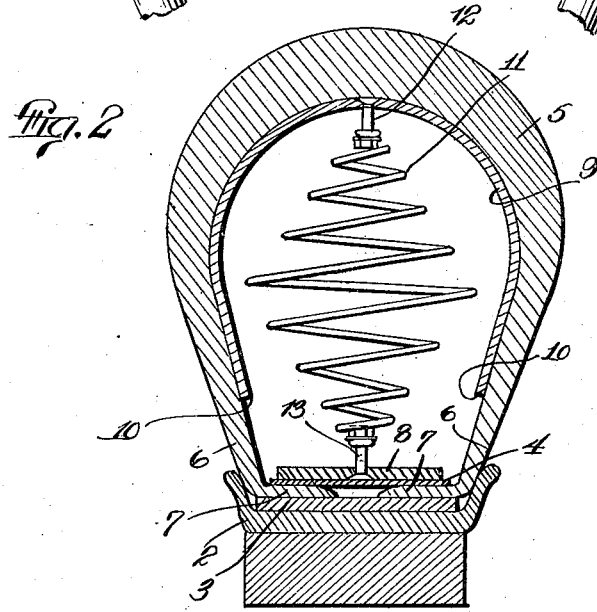
INVENTOR.
Vincent O. Woodruff

UNITED STATES PATENT OFFICE.

VINCENT O. WOODRUFF, OF BRIDGETON, NEW JERSEY.

RESILIENT TIRE.

1,419,001.   Specification of Letters Patent.   Patented June 6, 1922.

Application filed November 6, 1920. Serial No. 422,128.

*To all whom it may concern:*

Be it known that I, VINCENT O. WOODRUFF, a citizen of the United States, residing at Bridgeton, in the county of Cumberland and State of New Jersey, have invented certain new and useful Improvements in a Resilient Tire, of which the following is a specification.

This invention relates to resilient tires for vehicles and its primary object is to obviate the use of pneumatic inner tubes so that no air pressure will be required within the tire.

Another object of the invention is to provide a mechanism adapted to be encased within the ordinary outer protecting shoe whereby the desired resiliency will be obtained.

A still further object of the invention is to provide a mechanism of this character which will be extremely simple in construction so that it will be adapted to be manufactured and sold at a comparatively low cost.

Other objects of the invention will appear upon consideration of the following detail description and accompanying drawings:—

Figure 1 is a fragmentary view of a portion of an automobile tire and rim showing the invention applied thereto parts being broken away to more clearly disclose the general structure.

Figure 2 is a cross section taken on the line 2—2 of Fig. 1.

Referring to the drawing by numerals, the automobile felly is provided with the usual demountable rim 2 constructed in the manner well known in the automobile industry and as used on various types of automobile wheels. Mounted upon the rim 2 is an annular band 3 extending completely around the demountable rim 2. Extending around the band 3 is a cushion band 4 of felt or fabric or other suitable similar material and it will be noted that this is spaced from the band 3 so that an annular space is provided between the band 3 and the cushion band 4. The tire casing 5 is somewhat similar to the ordinary tire casing except that its marginal edges are tapered to a relatively thin portion 6 which is turned inwardly and between the annular cushion band and the base band 3 so that it is held in the space between the said bands. The two marginal edges therefore form fastening flanges 7 which are firmly held in position by the pressure band 8 which extends around the outside of the cushion band 4. The bands and tire casing are assembled by contracting the demountable rim in the usual manner. Fitted within the tire casing is a metallic shell 9 which is adapted to be inserted in the casing before the latter is mounted upon the rim of the wheel. It will be noted that this shell fits snugly within the interior of the tire casing and its marginal edges 10 are somewhat spaced from the annular band. This construction provides a metallic protector for the interior of the tire casing and eliminates the use of an inner tube since the shell 9 is resiliently held in position against the tire casing by coil springs 11 which are secured by fastening members 12 to the shell 9 and by similar fastening members 13 to the pressure band 8. It will be noted that the coils of the springs are of considerably greater diameter at the center of the springs so that the ends of the springs taper toward the fastening elements 12 and 13 where they are connected by suitable fastening devices such as nuts or the like. The springs are arranged in spaced relation within the tire and act to provide the desired resiliency.

Minor changes may be made in the details of construction without departing from the spirit of the invention or the scope of the claims hereunto appended.

What I claim is:—

1. In combination with a demountable rim of a vehicle wheel, a base band mounted on the rim, a cushion band extending around the base band and slightly spaced therefrom, a tire casing having its marginal edges tapered, the said marginal edges being turned inwardly and disposed in the space between the annular base band and the said cushion band, a pressure band upon the said cushion band, and spring pressed means interposed between the inner surface of the said tire casing and the said pressure band whereby a resiliency is obtained between the said tire casing and the said pressure band.

2. A vehicle tire comprising an outer casing, the marginal edges of the said casing being turned inwardly to provide opposite flanges, spaced apart annular bands mounted on a rim and having the said flanges disposed between the same, a pressure band mounted upon the outer one of the said annular bands, a shell arranged within the said casing, and springs connected to the shell and to the said pressure band and extending between the shell and pressure band to exert an outward pressure on the shell whereby the latter will resiliently support the said casing.

In testimony whereof, I have affixed my signature in the presence of two witnesses.

VINCENT O. WOODRUFF.

Witnesses:
CHARLES E. BELLOWS,
JOSEPH M. STRATTON.